United States Patent [19]

Craig

[11] Patent Number: 4,995,945

[45] Date of Patent: Feb. 26, 1991

[54] COUNTER-CURRENT GAS-LIQUID CONTACTING DEVICE

[75] Inventor: Andrew J. M. Craig, Yenda, Australia

[73] Assignee: Flavourtech Pty. Ltd., Griffith, Australia

[21] Appl. No.: 165,579

[22] Filed: Mar. 8, 1988

Related U.S. Application Data

[63] Continuation of Ser. No. 828,381, Feb. 11, 1986, abandoned.

[30] Foreign Application Priority Data

Feb. 11, 1985 [AU] Australia .............................. PG9216

[51] Int. Cl.$^5$ .......................... B01D 1/22; B01D 19/00
[52] U.S. Cl. .................... 202/177; 202/205; 202/236; 202/159; 55/36; 55/73; 55/190; 55/200; 159/6.1; 159/8; 159/12; 203/49; 203/89; 203/91; 203/98; 261/89; 423/539; 426/492; 426/494; 426/592; 426/599
[58] Field of Search ............... 203/89, 49, 72, 98, 203/91, 94, 99, 4, DIG. 19, DIG. 13, 19; 202/153, 162, 236, 177, 158, 238, 205, 234, 159; 159/6.1, 6.2, 6.3, 8, 12, 49; 261/89; 426/494, 493, 492, 592, 599; 55/36, 37, 46, 73, 190, 200; 423/539

[56] References Cited

U.S. PATENT DOCUMENTS

| | | | |
|---|---|---|---|
| 444,152 | 1/1891 | Madlener | 202/236 |
| 1,832,587 | 11/1931 | Schneible | 426/493 |
| 1,832,701 | 11/1931 | Graham | 261/89 |
| 1,844,643 | 2/1932 | D'Yarmett | 159/6.1 |
| 2,218,342 | 10/1940 | Pegram | 159/6.1 |
| 2,879,165 | 3/1959 | Hendel | 426/475 |
| 3,108,049 | 10/1963 | Bowers et al. | 159/6.1 |
| 3,223,533 | 12/1965 | Kelly | 426/492 |
| 3,300,868 | 1/1967 | Anderwert | 159/6.1 |
| 3,488,037 | 1/1970 | Prochazka et al. | 261/113 |
| 3,633,339 | 1/1972 | Wiewiorowski et al. | 55/37 |
| 3,833,479 | 9/1974 | Fredriksson | 202/235 |
| 3,957,588 | 5/1976 | Humiston | 203/94 |
| 4,158,092 | 6/1979 | Bötsch et al. | 528/500 |
| 4,199,398 | 4/1980 | Evkin et al. | 159/6.1 |
| 4,279,692 | 7/1982 | Chino et al. | 159/6.2 |
| 4,327,184 | 4/1982 | Johnson et al. | 203/49 |
| 4,341,595 | 7/1982 | Chino et al. | 159/6.2 |
| 4,437,937 | 3/1984 | McGraw | 203/DIG. 22 |
| 4,545,853 | 10/1985 | Feres | 159/7 |
| 4,584,064 | 4/1986 | Ciais et al. | 203/236 |
| 4,626,437 | 12/1986 | Schobinger et al. | 426/493 |

FOREIGN PATENT DOCUMENTS

| | | |
|---|---|---|
| 62264 | 5/1975 | Australia . |
| 499335 | 8/1975 | Australia . |
| 341363 | 6/1982 | Australia . |
| DE-B-1083784 | 4/1929 | Fed. Rep. of Germany . |
| 2542236 | 9/1974 | Fed. Rep. of Germany . |
| 2510206 | 8/1975 | Fed. Rep. of Germany . |
| 3332679 | 9/1983 | Fed. Rep. of Germany . |
| 3429777 | 8/1984 | Fed. Rep. of Germany . |
| 533303 | 2/1921 | France . |
| 897179 | 5/1944 | France ........................ 202/236 |
| 14867 | 8/1982 | France . |
| 2145110 | 3/1985 | United Kingdom . |

OTHER PUBLICATIONS

Abstract of French Patent No. 82 14867, 8/82.
Abstract of West German Patent No. 3,429,777, 8/84.
Abstract of West German Patent No. 3,332,679, 9/83.
Abstract of West Germany Patent No. 2,542,236, 9/74.
Abstract of West Germany Patent No. 2,927,661, 1/81.
Abstract of West German Patent No. 2,510,206, 8/75.

Primary Examiner—Wilbur Bascomb
Attorney, Agent, or Firm—Fitch, Even, Tabin & Flannery

[57] ABSTRACT

A counter-current contacting device which includes a number of features which increase the efficiency and/or increase the pressure differential across the device is disclosed. Systems for reducing the alcohol content of an alcohol containing beverage or wine, for stripping aroma and flavor from a fruit juice and for desulphuring a liquid containing dissolved sulphur dioxide are also disclosed. Each of these systems incorporate a counter-current contact device of the invention.

15 Claims, 5 Drawing Sheets

COUNTER-CURRENT GAS-LIQUID CONTACTING DEVICE

This is a continuation of application Ser. No. 828,381, filed Feb. 11, 1986 and now abandoned.

This invention relates to counter-current contacting devices and distillation columns of the rotating cone type in which include means to increase the efficiencies and/or increase the pressure differential across the devices or columns. The invention also relates to systems for reducing the alcohol content of an alcohol containing beverage or a wine, stripping aroma and/or flavour from a fruit juice or desulphuring a liquid containing dissolved sulphur dioxide which include the devices and columns of the invention. The invention further relates to methods of distilling, fractionally distilling and/or stripping a selected volatile component or components from a liquid which utilise the devices and columns of the invention.

Examples of prior art spinning disc and rotating cone columns are found:

G. B. Pegram et al., in Physics Review 49, page 883 (1936) and in J. Chemical Physics 4, page 623 (1936), J. R. Huffman and H. C. Urey, in Industrial Engineering Chemistry 29, page 531 (1937), B. J. Mair and C. B. Willingham, in J. Res. National Bureau of Standards 22, page 519 (1939)

Z. Ziolkowski et al., in Brzem. Chem. 42, page 512 (1963)

V. A. Yurchenko et al., in Khim. Neftyioe Mashinst 4, page 18 (1968),

Yu. I. Makarov and O. A. Troshkin, in Theoret. Osn. Khim. Tekhnol 3, page 84 (1968)

D. J. Casimir and J. N. Huntington in Symposium, On "Flavours of Fruits and Fruit Juices", International Federation of Fruit Juice Producers, Scientific-Technical Commission XV, Bern 1978, Commonwealth Scientific Industrial Research Organisation, Australian patent Application No. 62264/73.

Rotating cone and rotating disc columns have a number of characteristics which make them attractive counter-current vapour-liquid contacting devices. These characteristics have been described in "Variable Pressure-Drop Columns", Commonwealth Scientific Industrial Research Organisation, Australian Patent Application No. 62264/73 and "A Spinning Cone Distillation Column for Essence Recovery" by D. J. Casimir and J. N. Huntington in Symposium on "Flavours of Fruits and Fruit Juices", International Federation of Fruit Juice Producers, Scientific-Technical Commission XV, Bern 1978 and are outlined below:

(a) Large liquid/gas contact area;
(b) High differential velocity between the liquid/gas phases;
(c) Low entrainment of liquid droplets in the vapour phase due to the centrifugal redistribution of liquid at each rotating cone or disc;
(d) Low height equivalent to theoretical plate (H.E.T.P.);
(e) Low pressure drop per equilibrium stage and low hold-up with resultant rapid attainment of equilibrium; and
(f) Relatively low operating temperature due to lower gas pressure.

As a consequence of the above characteristics, rotating cone and rotating disc columns are considered to be especially suitable for the removal of heat labile component/s of liquid based mixtures. Particular applications include:

(i) Removal of fruit juice volatiles;
(ii) Removal of sulphur dioxide from fruit juices including grape juice;
(iii) Flavour and essence extraction of food products;
(iv) Removal of heat labile components from waste products;
(v) Processing of crude liquid petroleum products;
(vi) Removal of ester and flavour components of hop and grape extracts before or after fermentation. For example, since the carbon dioxide generated during fermentation acts as a stripper of flavours a rotating cone or rotating disc column could be used to remove the flavour components prior to fermentation and the flavour components could be subsequently returned on completion of the fermentation process;
(vii) Removal of alcohol from a liquid such as fermented hop extract.

In "Variable Pressure-Columns", Commonwealth Scientific Industrial Research Organisation, Australian Patent Application No. 62264/73 and in "A Spinning cone distillation Column for Essence Recovery" by D. J. Casimir and J. N. Huntington in Symposium on "Flavours of Fruits and Fruit Juices", International Federation of Fruit Juice producers, Scientific-Technical Commissioner XV, Bern 1978, rotating cone and disc columns were described wherein at least one fin or vane was affixed to the lower surface of each cone or disc mounted on a central shaft. In these types of columns the cones or discs rotate between frustoconical surfaces or between flat plates which are fixedly mounted on the wall of the cylindrical housing surrounding the central shaft. The bottom profile of each fin or vane is parallel to the frustoconical surface or flat plate surface located immediately beneath it.

In practice, however, it has been found by the present inventor that the top surface profile of liquid on a frustoconical surface or flat plate surface located proximately beneath a fin or vane, relative to that surface, is dependent on several factors.

A significant factor is the difference in the area of the top of a frustoconical surface in the vicinity of the outer cylindrical wall to the area of the top of that frustoconical surface in the vicinity of the central shaft For a given flow rate the area over which the corresponding volume of liquid flowing onto the top of a frustoconical surface in the vicinity of the outer cylindrical wall is significantly greater than the area of an equivalent width of a section of the top of that frustoconical surface over which an equal volume of liquid is flowing in the vicinity of the central shaft. Thus the liquid depth on the top of a frustoconical surface increases from the vicinity where the surface abuts the outer cylindrical wall to its inner edge in the vicinity of the central shaft. As a consequence whilst the fins or vanes of AU 62264/73 whose distal borders are parallel to the frustoconical surfaces they are not parallel to the top surface profiles of liquid flowing over these surfaces. The present inventor has found that the performance of these fins and vanes is lessened.

In AU 62264/73 the fins or vanes are depicted in the drawings as having rectangular cross sections. Aerodynamically this is not an optimal cross-section and thus the power required to turn a shaft supporting such fins or vanes is excessive.

The present inventor has also found that flooding of the rotating cone and disc columns of the type disclosed in AU 62264/73 occurs at high liquid flow rates due to the constriction between the distal edge of the stationary cone and the central shaft.

It is an object of this invention to provide a counter-current contacting device or distillation column having rotating cone or cones which include at least one fin which ameliorates the disadvantage of the fins and vanes of the prior art.

Another object is to provide a counter-current contacting device or distillation column having a rotating cone or cones which include at least one fin whose cross-section or cross-sections ameliorate the disadvantage of the cross-sections of the fins or vanes of the prior art.

A further obJect is to provide a counter-current contacting device or distillation column which ameliorates the problem of flooding in prior art columns at high liquid flow rates.

The present inventor has additionally discovered that the distillation, fractional distillation and/or stripping rate and/or efficiency of a rotating cone column is significantly enhanced by pumping a gas or gases and/or vapour or vapours through the column or by applying a vacuum to the column.

Another object is to provide a counter-current contacting device or distillation column which includes means to pump a gas or gases and/or vapour or vapours through the device or column and/or means to apply a vacuum to the device or column.

Because a gas and/or vapour stream can evaporate both water and flavour (also ethyl alcohol when dealcoholising) liquid flowing through a rotating cone column is naturally cooled as it descends the column. The degree of stripping of the discharged liquid is dependent on the temperature of the bottom of the column. However, because of the evaporative cooling effect, it is necessary to run the temperature at the top of the column at a higher level to achieve the desired temperature at the bottom of the column. For example, in dealcoholising where this effect is most dramatic, it would be necessary to run the temperature at the top of the column in AU 62264/73 at 90° C. to achieve a temperature of 70° C. at the bottom of the column. Or, similarly, when operating on flavour recovery of apple juice the temperature at the top of the column would drop from 65° C. to 61° C. as a result of this cooling.

When desulphuring a temperature of 125° C. may be needed at the bottom of the column and thus all of the product flow would have to be heated to 129° C..

When considering a stripping process it is necessary to have the hottest point at the area of lowest concentration to increase the vapour pressure and thus the ease of transfer from the liquid to the gas stream. Normally, in stripping, this problem is not encountered to the same degree because the stripping medium is saturated vapour from the reboiler. In the case of dealcoholising the effect is still pronounced because of the large volume of ethyl alcohol which has to be stripped. In this instance the same temperature at the bottom of the column is obtained by increasing the reboil rate.

To overcome this effect and ensure the highest temperature is at the bottom of the column where needed and thus ensure the product is at its hottest for as short a time as possible the present inventors have developed heat reinjection. This entails diverting part of the outgoing product to a heater then returning it to the column at the varying points (1st., 3rd., 5th, or 7th. plate) in the column.

Thus another object is to provide a counter-current contacting device or distillation column having means to recirculate liquid from a liquid outlet to proximately above a frustoconical surface located in the device or column including means to heat the liquid prior to its introduction into the device or column.

An additional object is to provide systems for reducing the alcohol content of an alcohol containing beverage or wine, stripping aroma from a fruit juice or desulphuring a liquid containing dissolved sulphur dioxide which include the counter-current contacting device or distillation columns of the invention.

A further objective is to provide methods of distilling, fractionally distilling or stripping a selected volatile component or components from a liquid which methods include utilising the counter-current contacting devices or distillation columns of the invention.

In a first embodiment this invention provides a counter-current contacting device or distillation column including a central shaft supporting at least one inverted cone said cone or cones having at least one fin extending from its or their lower surface or surfaces, the central shaft being rotatably located within a housing having one or more frustoconical surfaces extending from the inner wall thereof below the cone or between the cones supported on the central shaft, characterized in that the at least one fin has a profiled distal border that is substantially parallel to the surface of a liquid which is to flow or is flowing over the one or more frustoconical surfaces.

In a second embodiment this invention provides a counter-current contacting device or distillation column including a central shaft supporting at least one inverted cone, the cone or cones having at least one fin extending from its or their lower surface or surfaces, the central shaft being rotatably located within a housing having one or more frustoconical surfaces extending from the inner wall thereof below the cone or between the cones supported on the central shaft, characterized in that the housing is sealed and is associated with means to recycle a gas or gases and/or vapour or vapours through said column.

In a third embodiment this invention provides a counter-current contacting device or distillation column including a central shaft supporting a plurality of inverted cones, each cone having at least one fin extending from its lower surface, the central shaft being rotatably located within a housing having a plurality of frustoconical surfaces extending from the inner wall thereof between the cones supported on the central shaft, characterized in the said housing has associated therewith means to recirculate liquid from at least one liquid outlet associated with the housing to proximately above at least one of the frustoconical surfaces and including means to heat the liquid prior to its re-introduction into the housing.

In a fourth embodiment this invention provides a counter-current contacting device or distillation column including a central shaft supporting at least one inverted cone the cone or cones having at least one fin extending from its or their lower surface or surfaces, the central shaft being rotatably located within a housing having one or more frustoconical surfaces extending from the inner wall thereof below the cone or between the cones supported on the central shaft, characterized in that the at least one fin is or are curved to reduce resistance to rotation of the at least one fin caused by a gas or gases and/or vapour or vapours in the column.

In a fifth embodiment this invention provides a method of distilling, fractionally distilling or stripping a selected volatile component or components from a liquid which method includes: feeding the liquid into a counter-current contacting device or distillation column with at least one liquid inlet, at least one gas or gases and/or vapor or vapours outlet, a central shaft supporting at least one inverted cone the cone or cones having at least one fin extending from its or their lower surface or surfaces, the central shaft being rotatably located within a housing having one or more frustoconical surfaces extending from the inner wall thereof below the cone or between the cones supported on the central shaft, characterized in that the at least one fin has a profiled distal border that is substantially parallel to the surface of a liquid which is to flow or is flowing over the one or more frustoconical surfaces; rotating the central shaft whilst at least a portion of the fed liquid is resident in said device or column to generate a flow of gas or gases and/or vapour or vapours proximately above the liquid; collecting at least a portion of gas or gases and/or vapour or vapours which have been distilled, fractionally distilled or stripped from the liquid by the generated gas or gases and/or vapour or vapours flow; and isolating the selected volatile component or components therefrom.

In a sixth embodiment this invention provides a method of distilling, fractionally distilling or stripping a selected volatile component or components from a liquid which method includes feeding the liquid into a counter-current contacting device or distillation column with at least one liquid inlet, a gas or gases and/or vapour or vapours inlet and outlet, a central shaft supporting at least one inverted cone, the cone or cones having at least one fin extending from its or their lower surface or surfaces, the central shaft being rotatably located within a housing having one or more frustoconical surfaces over which liquid is to flow or is flowing the surface or surfaces extending from the inner wall thereof below the cone or between the cones supported on the central shaft, characterized in that the housing is sealed and is associated with means to recycle a gas or gases and/or vapour or vapours through the column via the gas or gases and/or vapour or vapours inlet and outlet; rotating the central shaft whilst at least a portion of the fed liquid is resident in the device or column to generate a flow of gas or gases and/or vapour or vapours proximately above the liquid; recycling gas or gases and/or vapour or vapours through the column; and isolating the selected volatile component or components from at least a portion of gas or gases and/or vapour or vapours which have been distilled, fractionally distilled or stripped from the liquid by the generated gas or gases and/or vapour or vapours flow.

In a seventh embodiment this invention provides a method of distilling, fractionally distilling or stripping a selected volatile component or components from a liquid which method includes: feeding the liquid into a counter-current contacting device or distillation column with at least one liquid inlet, at least one gas or gases and/or vapour or vapours outlet, a central shaft supporting a plurality of inverted cones, each cone having at least one fin extending from its lower surface, the central shaft being rotatably located within a housing having a plurality of frustoconical surfaces extending from the inner wall thereof between the cones supported on the central shaft, characterized in that the housing has associated therewith means to recirculate liquid from the liquid outlet to proximately above at least one of the frustoconical surfaces and including mean to heat the liquid prior to its introduction into the housing; rotating the central shaft whilst at least a portion of the fed liquid is resident in the device or column to generate a flow of gas or gases and/or vapour or vapours proximately above the liquid; collecting at least a portion of gas or gases and/or vapour or vapours which have been distilled, fractionally distilled or stripped from the liquid by the generated gas or gases and/or vapour or vapours flow; and isolating the selected volatile component or components therefrom.

In an eighth embodiment this invention provides a method of distilling, fractionally distilling or stripping a selected volatile component or components from a liquid which method includes: feeding the liquid into a counter-current contacting device or distillation column with at least one liquid inlet, at least one gas or gases and/or vapour or vapours outlet, a central shaft supporting at least one inverted cone the cone or cones having at least one fin extending from its or their lower surface or surfaces, the central shaft being rotatably located within a housing having one or more frustoconical surfaces extending from the inner wall thereof below the cone or between the cones supported on the central shaft, characterized in that the at least one fin is or are curved to reduce resistance to rotation of the at least one fin caused by a gas or gases and/or vapour or vapours in the column; rotating the central shaft whilst at least a portion of the fed liquid is resident in the device or column to generate a flow of gas or gases and/or vapour or vapours proximately above the liquid; collecting at least a portion of gas or gases and/or vapour or vapours which have been distilled, fractionally distilled or stripped from the liquid by the generated gas or gases and/or vapour or vapours flow, and isolating the selected volatile component or components therefrom.

The housing can be a cylinder, rectangular prism, square prism or other like shape.

In preferred forms where applicable the housing is sealed and associated with the housing vacuum pumping means to reduce the pressure of gas or gases and/or vapour or vapours in the column and thereby increase the distillation, fractional distillation and/or stripping rate and/or efficiency of a selected volatile component or components from the liquid.

It is preferred that where appropriate:

(a) the at least one fin has a profiled distal border that is substantially parallel to the surface of a liquid which is to flow or is flowing over the one or more frustoconical surfaces; and/or (b) the housing is sealed and is associated with means to recycle a gas or gases and/or vapour or vapours through the column; and/or (c) the housing has associated therewith means to recirculate liquid from at least one liquid outlet to proximately above at least one of the frustoconical surfaces and including means to heat the liquid prior to its reintroduction into the housing; and/or (d) the cross-section of the at least one fin is or are curved to reduce resistance to rotation of the at least one fin caused by a gas or gases and/or vapour or vapours in the column.

The cross-section of the at least one fin can be S-shaped, rectangular shaped, parallelogram shaped, U-shaped, V-shaped, scooped, forward bending or other like shape.

Preferably, where appropriate there are at least two lower frustoconical surfaces below the at least one liquid outlet and at least two upper frustoconical surfaces above the at least one liquid outlet and the spacing or spacings between the at least two lower frustoconical surfaces is or are greater than the spacing or spacings between said at least two upper frustoconical surfaces above the at least one liquid outlet, as shown at 101 and 102 in FIG. 4, to provide for an increased flow volume of the liquid across the at least two lower frustoconical surfaces as compared with that across the at least two upper frustoconical surfaces above the at least one liquid outlet.

With the application of heat reinjection there is a higher product flow rate in the bottom of the column than the top of the column. This has two effects:

(1) Flooding will occur in the bottom of the column before the full product flow rate has been reached thus reducing the plant capacity (2) The pressure drop across the column is decreased because the blades are only in close proximity to the liquid surface in the bottom of the column.

When the spacing between the cones is larger at the bottom of the column that at the top this problem is ameliorated.

It is preferred where appropriate that there is at least one fan blowing or sucking means attached to the central shaft to increase the flow rate through the column of the gas or gases and/or vapour or vapours and thereby increase the distillation, fractional distillation or stripping rate and/or efficiency of a selected volatile component or components from the liquid.

Preferably where appropriate the housing is sealed and is associated with means to pump gas or gases and/or vapour or vapours through the column to increase the flow rate through the column of the gas or gases and/or vapour or vapours and thereby increase the distillation, fractional distillation or stripping rate and/or efficiency of a selected volatile component or components from the liquid.

The device or column can include a heat exchange jacket surrounding at least a portion of the housing.

Conveniently there are a plurality of fins with identical cross-sectional shapes extending from the lower surface or surfaces of the cone or cones and wherein the fins are radially disposed about the central shaft. A fin or fins can include a flute or flutes on its or their distal border or borders.

Optionally the upper surface or surfaces of said one or more frustoconical surfaces includes at least one liquid baffle in the vicinity of and up to its or their distal edge or edges to change a spiralling flow of the liquid over the one or more frustoconical surfaces to a flow in a selected direction with the proviso that the selected direction has a component of flow towards the distal edge. Conveniently there is at least one aperture through the one or more frustoconical surfaces adjacent at least one liquid baffle to drain at least a portion of liquid which is to flow or is flowing in the selected direction through the one or more frustoconical surfaces. As the liquid path on a frustoconical surface is spiral the liquid baffle projects into the liquid and diverts towards the central shaft. Thus in contrast to the rotating cone column of AU 62264/73 where the liquid leaves a frustoconical surface in a continual film along the complete circumference of the distal edge of the frustoconical surface the liquid baffle separates the gas and liquid streams and thus reduces the risk of flooding.

It is preferred that the lower surface or surfaces of the one or more frustoconical surfaces includes at least one gas baffle extending therefrom to cause gas which is to flow or is flowing in the vicinity of the lower surface or surfaces to flow in a selected direction.

The device or column can be stainless steel, glass, teflon coated stainless steel or any other suitable material.

Preferably nitrogen, argon, helium, carbon dioxide or other like gas is recirculated through the device or column. Nitrogen is particularly preferred because it is inexpensive and yet counters the deleterious effect air, and in particular oxygen, on the aroma and flavour extracts. For example when desulphuring grape juice the temperature can be as high as 130° C. which will cause caramelisation of the juice if oxygen is present.

Normally, in conventional evaporators, the stripping medium is steam generated in the reboiler. This same principle is used in AU 62264/73. To generate steam, boiling must be induced and this requires the use of a higher temperature or a lower vacuum. A lower vacuum unlike nitrogen can cause problems with air leaks through seals of pumps, pipes, flanges, etc., causing damage to the flavour and the product, while a higher temperature can damage heat labile flavours.

The use of nitrogen as a stripping medium also has the advantage of higher flow rate for the stripping medium (the transfer rate controlling variable) than can be obtained by the use of steam. For example, a nitrogen flow rate of 500 cubic metres per hour requires the evaporation of 239 liters of product at $-20Kpa$. This is approximately 5% of the product feed rate which would have to be concentrated in another plant to achieve a flavour strength of 0.5% which can be obtained in a rotating cone column of the invention. It would also require the temperature in the reboiler to be operated at 93.5° C. compared with 65°-70° C. as is the case for a rotating cone column of this invention.

Nitrogen can be fed into the bottom of the column and let to the atmosphere after flavour removal. However, to achieve desirable economies, the nitrogen is preferably recirculated in a closed system with the only nitrogen required being that required to initially purge the system.

The invention includes where appropriate a method whereby the concentration of the isolated selected volatile component or components is or are at least partially selected by selectively controlling the rate at which the gas or gases and/or vapour or vapours passes through the device or column.

Where appropriate the invention also includes a method wherein the concentration of the isolated selected volatile component or components is or are at least partially selected by selectively controlling the rate at which the liquid is fed into the device or column.

Optionally the invention includes where appropriate a method wherein the concentration of the isolated selected volatile component or components is at least partially selected by selecting the temperature of the liquid which is fed into the device or column.

The invention includes a system for reducing the alcohol content of an alcohol containing beverage including a source of the beverage, a beverage inlet line coupled with said source, a beverage feeding means for feeding beverage from the source through the beverage inlet line, and a counter-current contacting device or distillation column of this invention coupled with the beverage product line for distilling, fractionally distilling and/or stripping alcohol from the beverage.

Also included is a system for reducing the alcohol content of a wine including a source of the wine, a wine inlet line coupled with the source, a wine feeding means for feeding wine from the source through the wine inlet line and a counter-current contacting device or distillation column of this invention coupled with the wine product inlet line for distilling, fractionally distilling and/or stripping alcohol from the wine.

Further included is a system for stripping aroma and/or flavour from a fruit juice including a source of the fruit juice, a fruit juice inlet line coupled with the source, a fruit juice feeding means for feeding fruit juice from the source through the fruit juice inlet line and a counter-current contacting device or distillation column of this invention coupled with the fruit juice inlet line for distiling, fractionally distilling and/or stripping aroma and/or flavour from the fruit juice.

This invention also includes a system for desulphuring a liquid containing dissolved sulphur dioxide including a source of the liquid, a liquid inlet line coupled with the source, a liquid feeding means for feeding liquid from the source through the liquid inlet line and a counter-current contacting device or distillation column of this invention coupled with the liquid inlet line for stripping sulphur dioxide from the liquid.

Preferred embodiments of the invention are illustrated by way of example in the accompanying drawings in which.

Figure 5:
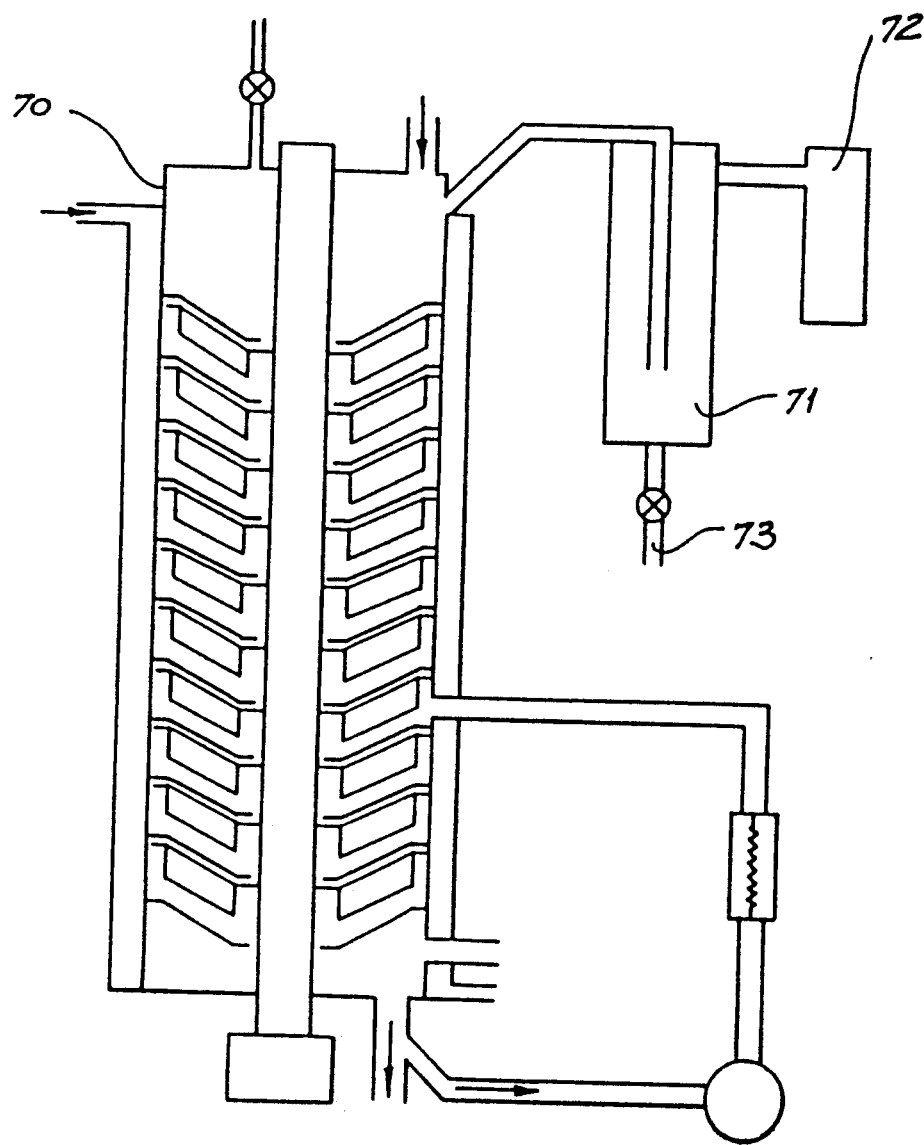
Figure 6:
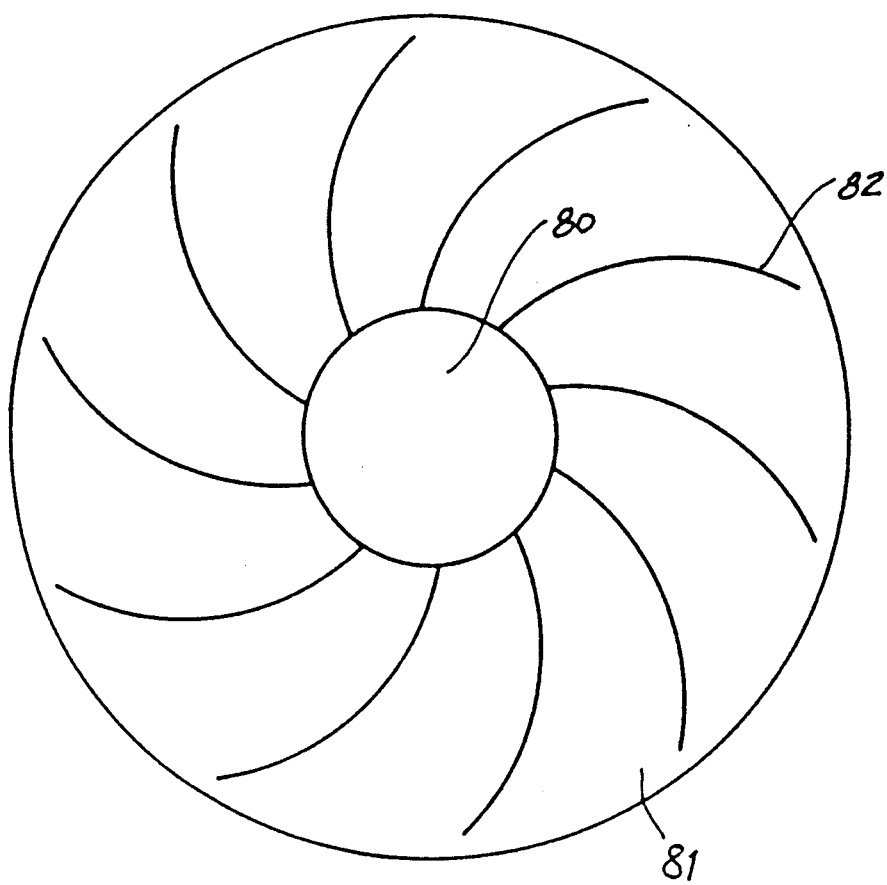

FIG. 5 is a schematic sectional side elevation of a rotating cone column having a vacuum pump to reduce the pressure of gas or gases and/or vapour or vapours in the column and means to recirculate liquid from the column to above a frustoconical surface and including means to heat the liquid prior to its introduction into the housing; and FIG. 6 is a cross-sectional bottom view of a central shaft supporting an inverted cone having a plurality of curved fins.

Figure 1:
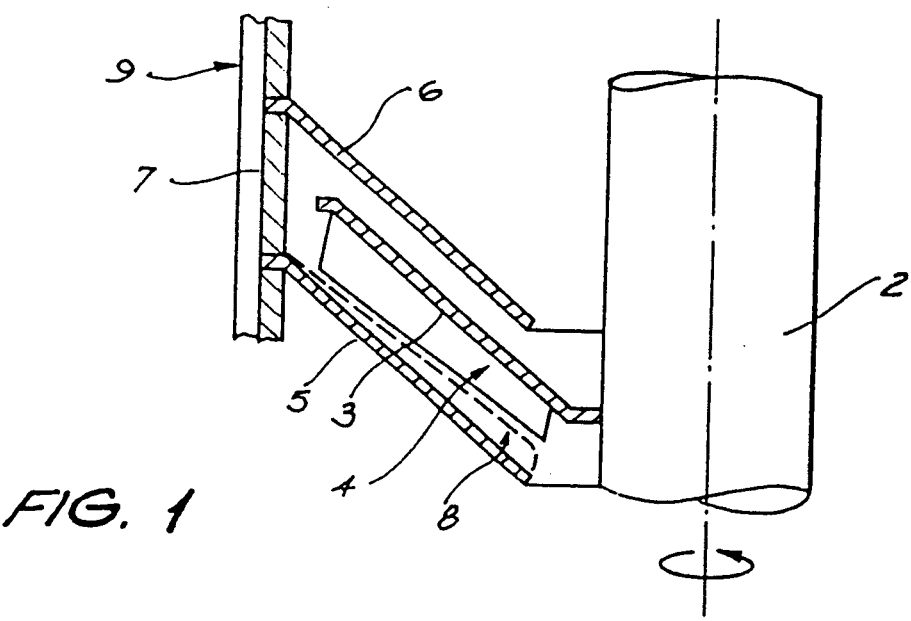
FIG. 1 is a schematic sectional side elevation of a fin having a profiled distal border which is substantially parallel to the surface of liquid flowing over a frustoconical surface.

FIG. 1 depicts inverted cone 3 having a fin 4 extending from its lower surface. Cone 3 is mounted on central shaft 2 which is rotatably located within cylindrical housing 7. Frustoconical surfaces 5, 6 extend from the inner wall of housing 7 towards shaft 2. The gap between the inner edges of frustoconical surface 6 and central shaft 2 is sufficient to permit liquid to flow freely onto surface 3 at a maximum selected liquid flow rate through a rotating cone column having a plurality of cones and frustoconical surfaces without significant interference by the liquid to a flow rate of gas and/or vapour through the column In addition, the gap between surface 3 and the inner surface of wall 7 is sufficient to permit liquid to flow freely onto frustoconical surface 5 at the maximum selected flow rate through a rotating cone column without significant interference by the flowing liquid to gas and/or vapour flowing through the column.

Fin 4 has a profiled distal border that is substantially parallel to the surface of a liquid 8 which is to flow or is flowing over frustoconical surface 5. Wall 7 is enclosed by a steam/hot water jacket 9 which can be used to heat the contents of the rotating cone column. Shaft 2 is adjustable up or down whereby the gap between the distal border of fin 4 and liquid 8 can be selected.

Figure 2:
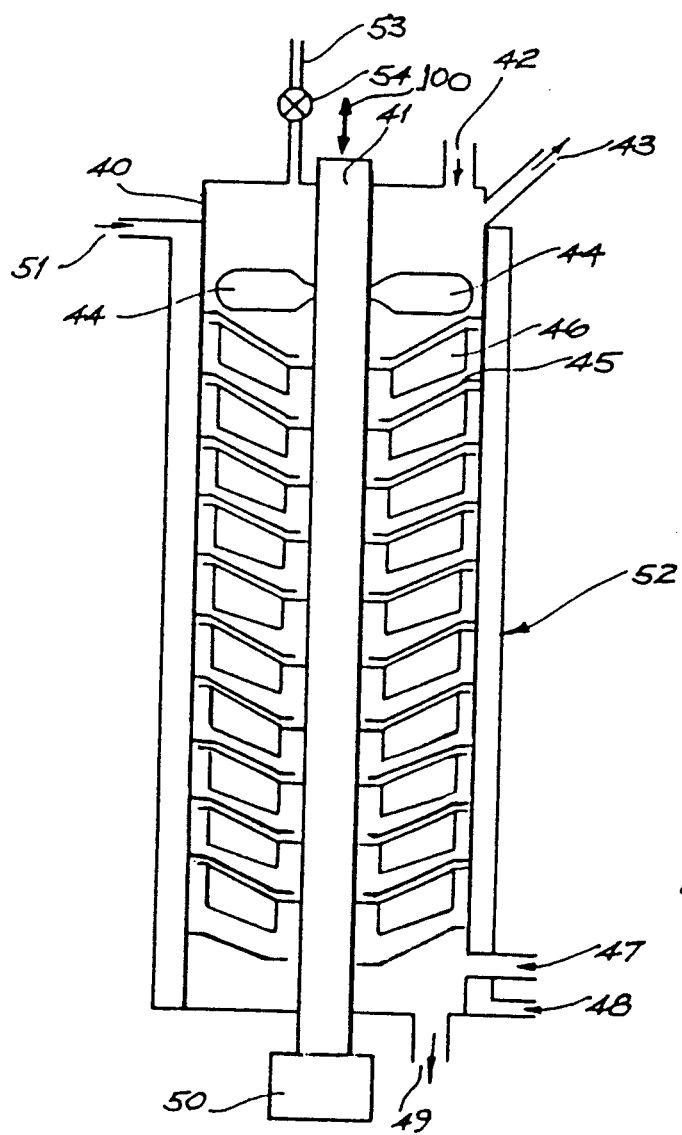
FIG. 2 is a schematic sectional side elevation of a rotating cone column having a plurality of fins of the type of FIG. 1.

Referring to FIG. 2 a rotating cone column 40 having a plurality of fins 46 of the type of FIG. 1 are supported on central shaft 41 between a plurality of frustoconical surfaces 45.

Column 40 includes jacket 52 which has a steam/hot water inlet 48 and outlet 51. Column 40 includes gas inlet and outlet 47, 43, liquid inlet and outlet 42, 49 and vent 53 which is open and closed via valve 54. Shaft 41 which is rotated by motor 50 is adjustable up and down, as shown at 100, whereby the gap between the distal borders of fins 46 and liquid which is to flow or is flowing through the column on surfaces 45 can be selected. The adjustability of shaft 41 is particularly useful since the height of liquid flowing over surfaces 45 varies in proportion to the liquid flow rate through column 40. Fan 44 is mounted on shaft 41 to provide an upward sucking force and thereby increase the flow rate through column 40 of gas or gases and/or vapour or vapours and hence increase the distillation, fractional distillation or stripping rate and/or efficiency of a selected volatile component or components from liquid flowing through column 40.

In use liquid having a volatile component or components is fed into column 40 via inlet 42. Shaft 41 is rotated whilst at least a portion of the fed liquid is resident in column 40 to generate a flow of gas or gases and/or vapour or vapours proximately above the liquid A portion of gas or gases and/or vapour or vapours which are distilled, fractionally distilled or stripped from the liquid via the generated gas or gases and/or vapour or vapours flow are collected from outlet 43 and stored or condensed and then stored. Liquid fed to the column via inlet 42 is typically pre-heated.

Figure 3:
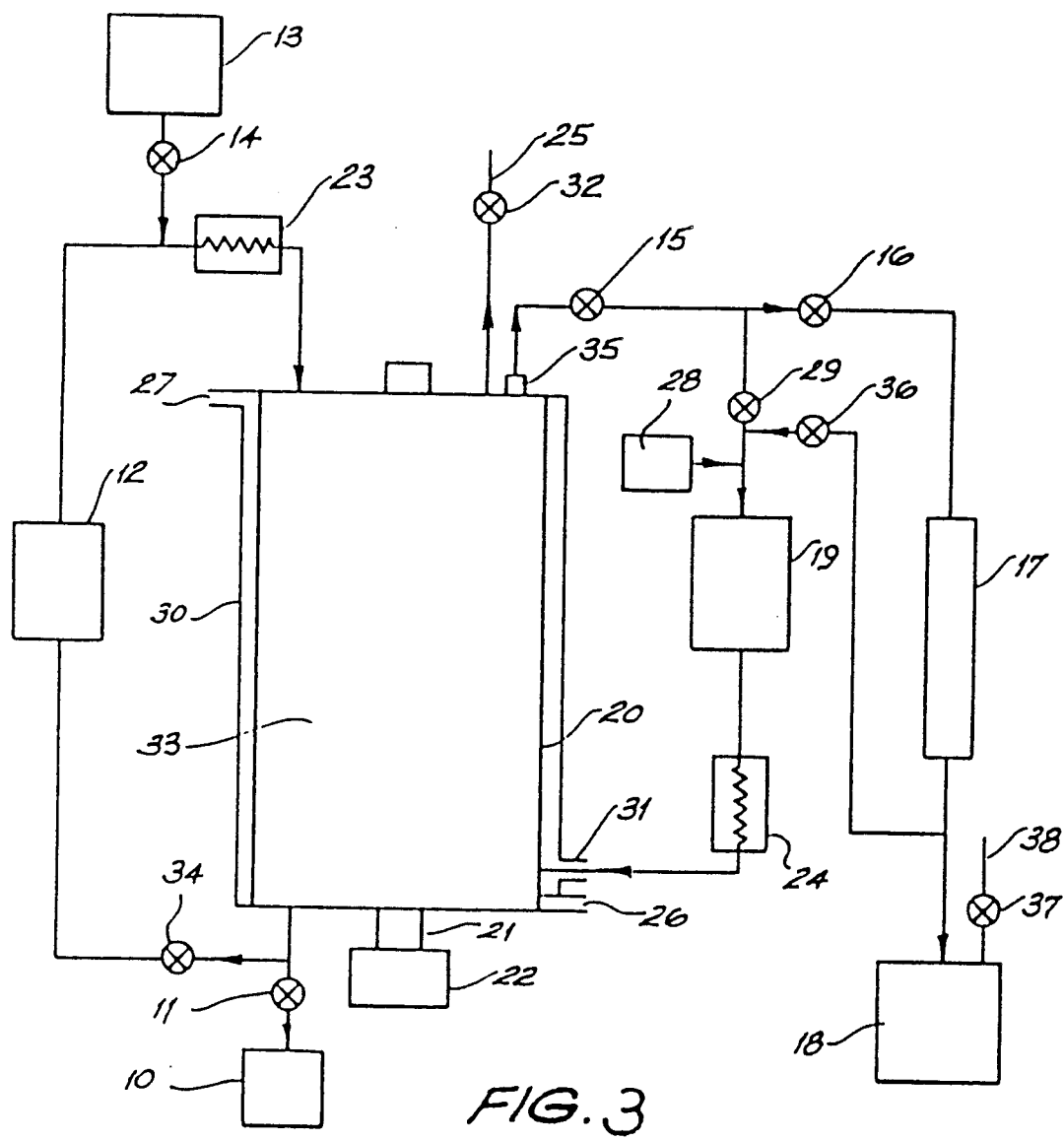
FIG. 3 is a block diagram of an extraction plant which incorporates a rotating cone column.

The extraction plant of FIG. 3 can be used to distil, fractionally distil or strip a selected volatile component or components from a liquid including reducing the alcohol content of an alcohol containing beverage, reducing the alcohol content of a wine, stripping aroma and/or flavour from a fruit juice or desulphuring a liquid containing dissolved sulphur dioxide.

The liquid from which a volatile component or components is to be distilled, fractionally distilled or stripped is fed from reservoir 13 via valve 14 and preheater 23 into rotating cone column 33. Suitable feeding means is a counter-current diffusion extractor of the type described in Howden Refrigeration Pty Limited and Commonwealth Scientific and Industrial Research Organisation, Australian Patent Application No. AU 72358/81. Column 33 is depicted in detail in FIG. 2 and includes vertically adjustable central shaft 21 rotatably driven by motor 22 and steam/hot water jacket 30 having inlet and outlet 26, 27. After passing through column 33 the extracted liquid can be partially or totally drained to container/drain 10 via valve 11 and/or partially or totally recycled via valve 34, pump 12 and heater 23 back into column 33. The distillation, fractional distillation and/or stripping of the liquid can be performed under an atmosphere of air or a selected atmosphere such as nitrogen by providing nitrogen via gas reservoir 28 to pump 19. Column 23 is initially purged by pumping nitrogen via preheater 24, inlet 31 and vent 25 with valve 32 open and valve 15 closed. After purging, valve 32 is closed and liquid is fed into column 33 as described above with valve 15 opened. If desired, column 33 can be allowed to reach steady state by recirculating the gas/vapour mixture resulting from the distillation, fractional distillation and/or stripping process using pump 19 with valve 29 open and valves 16 and 36 closed. On attaining steady state valve 29 is closed and valve 16 opened and at least a portion of the resultant extracted vapour or vapours and/or gas or gases condensed via condensor 17, the distillate being collected in storage container 18. Nitrogen passing through condensor 17 can be recirculated through column 33 by opening valve 36 and closing valve 37 or alternatively can be vented through vent 38 via valve 37. Pump 19 can be used to increase gas and/or vapour flow rate through column 33 during a distillation, fractional distillation and/or stripping procedure.

Figure 4:
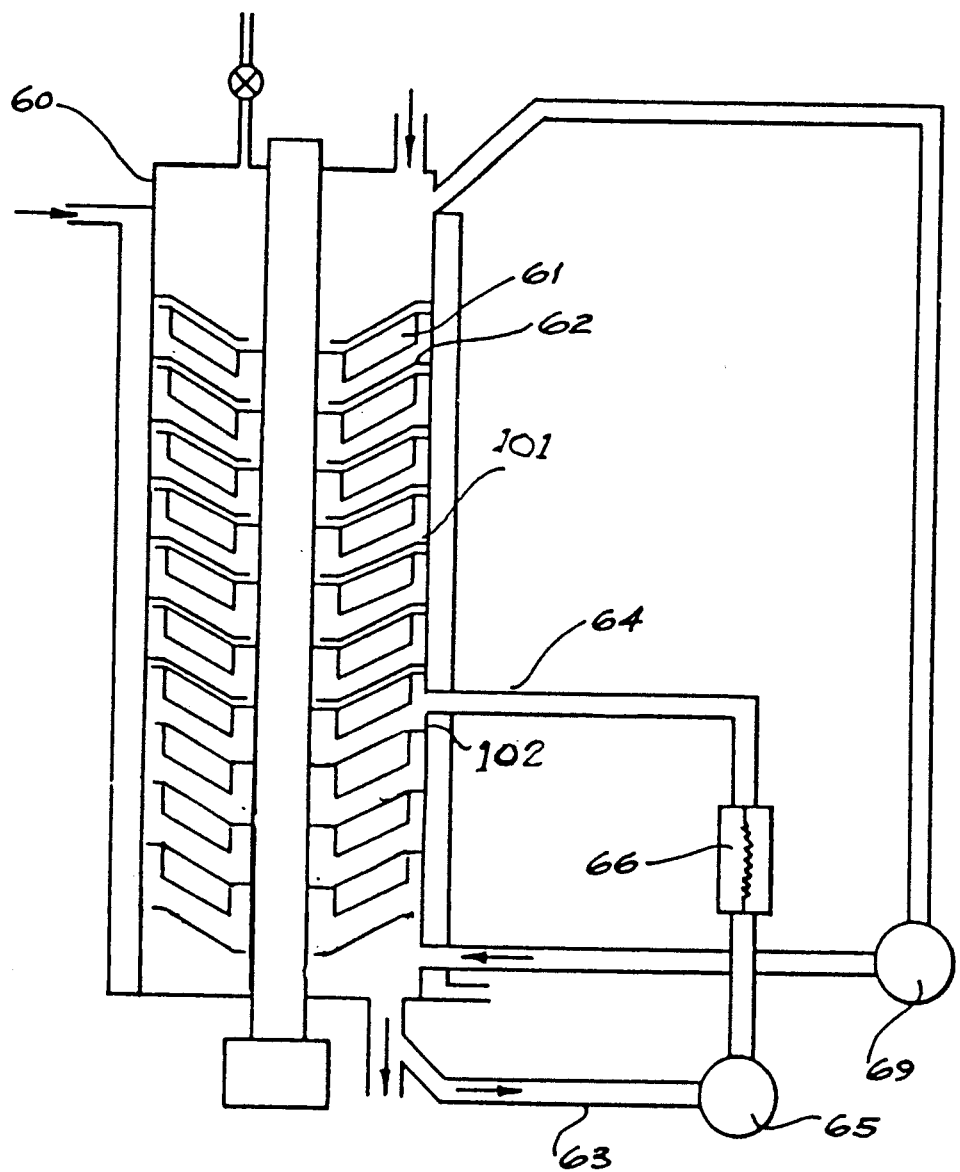
FIG. 4 is a schematic sectional side view of a rotating cone column having means to recycle gas through the column and means to recirculate liquid to proximately above a frustoconical surface and including means to heat the liquid prior to its introduction into the housing.

Referring to FIG. 4 rotating cone column 60 is similar to column 40 of FIG. 2 except the fan 44 of FIG. 2 has not been included and a fin 61 has a profile distal border which is substantially parallel to the upper surface of a proximately located frustoconical surface 62.

Column 60 has associated therewith outlet and inlet lines 63 and 64 through which at least a portion of liquid from column 60 is recirculated to above a frustoconical surface via pump 65 and heater 66. Heater 66 heats the liquid prior to its introduction into column 60.

Column 60 is also associated with means to recycle a gas or gases and/or vapour or vapours through column 60 which includes gas or vapour inlet and outlet lines 67, 68 through which gas and/or vapour is recirculated via pump 69.

Rotating cone column 70 in FIG. 5 is similar to column 60 in FIG. 4 except column 70 is not associated with means to recycle a gas or gases and/or vapour or vapours through it but it does include condensor 71 which couples column 70 and vacuum pump 72.

In the operation of column 70 pump 72 pulls a vacuum to reduce the pressure of gas or gases and/or vapour or vapours in column 70 and thereby increases the distillation, fractional distillation and/or stripping rate and/or efficiency of a selected volatile component or components from liquid in column 70. The resultant gas and/or vapour are condensed in condensor 71 from which they can be removed via drain 73.

FIG. 6 depicts a cross-sectional bottom view of a central shaft 80 supporting an inverted cone 81 having a plurality of curved fins 82. Curved fins 82 have the advantage of decreasing motor loading without significantly changing the performance of a rotating cone column. As a result the power requirement to a motor driving shaft 80 is estimated to be up to 25% less than for non-curved radially extending fins.

EXAMPLE 1

A comparison of the performances of a rotating cone column of this invention against a prior rotating cone column is given in Table 1:

TABLE 1

| Evaporator Type | % Alcohol Remaining[1] | Pressure Drop Across Column[2] | Pressure Drop Per Stage[3] |
|---|---|---|---|
| Rotating Cone Column of invention (Profiled fins) | 5.7% v/v | 1215 Nm$^{-2}$ | 140 Nm$^{-2}$ |
| Prior Rotating Cone Column (Non profiled fins; Column as described in AU 62264/73) | 7.0% v/v | 349 Nm$^{-2}$ | 90 Nm$^{-2}$ |

Notes:
[1]Conditions: Gas flow = 0.01 · s$^{-1}$; original alcohol content 10.1% v/v; reboiler temperature (prior rotating cone column) = 75° C.
[2]Conditions: Gas flow = 0.01 · s$^{-1}$; product flow 0.01 · s$^{-1}$.
[3]Conditions: Gas flow = 0.01 · s$^{-1}$; product flow 1.941 · s$^{-1}$.

From Table 1 it is apparent that a rotating cone column of the invention strips a higher percentage of alcohol for zero gas flow than the prior rotating con column which exemplifies improved column performance provided by the profiled fins in the column of the invention. Table 1 also lists improved pressure drops per stage and across the rotating cone column of the invention of those of the prior rotating cone column. This further exemplifies improved column performance imparted by the profiled fins in the column of the invention.

EXAMPLE 2

A study of the effect of product flow rate through a rotating cone column of the invention on pressure drop across the column was conducted without and with an externally induced gas flow through the column. The results are listed in Tables 2 and 3 respectively:

TABLE 2

| Production Flow Rate l · hr$^{-1}$ | Reinjection Flow l · hr$^{-1}$ | Gas Flow Rate m$^3$hr$^{-1}$ | Pressure Drop Nm$^{-2}$ |
|---|---|---|---|
| 0 | 0 | 0 | −1215 |
| 1000 | 0 | 0 | −1509 |
| 2000 | 0 | 0 | −1627 |
| 3000 | 0 | 0 | −1666 |
| 4000 | 0 | 0 | −1705 |
| 5000 | 0 | 0 | −1844 |
| 6000 | 0 | 0 | −1774 |
| 7000 | 0 | 0 | Flooded |

The results indicate as product flow rate increases the gap between the liquid surface on the stationary cone and the blades decreases the pressure drop across the column increases causing a corresponding increase in the gas pumping efficiency of the column.

TABLE 3

| Production Flow Rate l · hr$^{-1}$ | Reinjection Flow l · hr$^{-1}$ | Gas Flow Rate m$^3$hr$^{-1}$ | Pressure Drop Nm$^{-2}$ |
|---|---|---|---|
| 0 | 0 | 400 | −2489 |
| 1000 | 0 | 400 | −2861 |
| 2000 | 0 | 400 | −3391 |
| 3000 | 0 | 400 | −4116 |
| 4000 | 0 | 400 | −4802 |
| 5000 | 0 | 400 | −4606 |
| 6000 | 0 | 400 | −4508 |
| 7000 | 0 | 400 | Flooded |

The pressure drop with an externally induced high gas flow in the column is positive and increases as the product flow rate is increased to 4000 l.hr$^{-1}$. At higher product flow rates the decreasing blades t liquid surface distance causes increased gas pumping efficiency which results in a lowering of the pressure drop as the product flow rate is increased from 4000 to 7000 l.hr−1.

EXAMPLE 3

An investigation of the effect of the flow rate of product reinjected into a rotating cone column of the invention on pressure drop across the column without and with an externally induced gas flow through the column was performed. The findings are listed in Tables 4 and 5 respectively:

TABLE 4

| Production Flow Rate l · hr$^{-1}$ | Reinjection Flow l · hr$^{-1}$ | Gas Flow Rate m$^3$hr$^{-1}$ | Pressure Drop Nm$^{-2}$ |
|---|---|---|---|
| 3000 | 0 | 0 | −1666 |
| 3000 | 1000 | 0 | −1686 |
| 3000 | 2000 | 0 | −1705 |
| 3000 | 3000 | 0 | −1705 |
| 3000 | 4000 | 0 | Flooded |

As reinjection flow rate increases a slight increase in gas pumping efficiency of the column is achieved but as the top part of the column still has a large gap between the blade this increase is not as large as that observed for comparable increases in the product flow rate (see Table 2)

TABLE 5

| Production Flow Rate l · hr$^{-1}$ | Reinjection Flow l · hr$^{-1}$ | Gas Flow Rate m$^3$hr$^{-1}$ | Pressure Drop Nm$^{-2}$ |
|---|---|---|---|
| 3000 | 0 | 400 | −4116 |
| 3000 | 1000 | 400 | −4312 |
| 3000 | 2000 | 400 | −4449 |
| 3000 | 3000 | 400 | −4214 |
| 3000 | 4000 | 400 | Flooded |

As reinjection flow rate increases the pressure drop increases and then decreases as the blades come into closer proximity with the liquid surface through the size of decrease is lower than for corresponding increases in product flow rate because of the low flow rate in the top of the column.

EXAMPLE 4

Conventional systems for the stripping of aromas from fruit juices normally are carried out in one of the effects of the evaporator or in a single stage prior to the evaporator. These strippers are normally single effect and the percentage stripped varies depending on the type of juice being processed. e.g. 10% in the case of apples and 30% in the case of concord grapes. Because of the large volume of product which is required to be evaporated conventional systems utilise fractionating columns to concentrate these flavours.

A system for stripping aromas from fruit juices using the rotating cone column of the invention achieves its stripping action in the column. The deflavoured juice can then be processed (fining and filtered) and concentrated without degrading the flavour component. Because the rotating cone column is a multistage (40 effects) stripping process only a small percentage (1 to 2 percent) is evaporated to achieve the desired stripping effect. This in turn renders the concentration of the aromas in fractionating columns unnecessary and they are collected by simple condensation.

The percentages of ethyl acetate (one of the components of apple juice) remaining after passing through a single effect distillation column and an eight effect rotating cone column of the invention are as listed in Table 6:

TABLE 6

| | Percentage Remaining of Ethyl Acetate Remaining in Liquid Stream | |
|---|---|---|
| Percent Evaporated | Single Effect | Eight Effect |
| 0 | 100 | 100 |
| 5 | 43.2 | 0.1 |
| 10 | 26.5 | 0.0 |
| 30 | 8.5 | 0.0 |

That is, the rotating cone column removes most of the ethyl acetate after only 5% of the total volume has been evaporated compared with 8.5% ethyl acetate remaining after 30% of the total volume has been evaporated by a single distillation column. In practice, the costs associated with flavour extract storage and transport are minimised when the extract is prepared using a rotating cone column of the invention since the column removes a large percentage of the flavours and aromas from the juice and simultaneously produces a highly concentrated extract.

A comparison of typical flavour extract volumes expressed as percentages of the total fruit juice volume are listed in Table 7:

TABLE 7

| Evaporator Type | Flavour Extract (% of Total Volume) |
|---|---|
| Rotating Cone Column of invention (Externally induced gas flow; Profiled fins) | 0.5-2% (up to 5%) |
| Prior Rotating Cone Column (Externally induced gas flow; non-profiled fins; Column as described in AU 62264/73) | 2%-10% |
| Presently Used Commercial Fruit Juice Evaporators | 10%-30% |

A typical procedure for preparing fruit juice which includes using the rotating cone column of the invention is as follows:

1. Extract juice using known extraction procedures.
2. Remove flavour extract with Recovery Plant which includes a rotating cone column and place extract in suitable storage. Typically conditions under which a column of the invention is operated are listed in Table 8:

TABLE 8

| | Apple Juice | Orange Juice |
|---|---|---|
| Product Flow Rate | 5,000 l · hr$^{-1}$ | 5,000 l · hr$^{-1}$ |
| Operating Temperature | 70° C. | 65° C. |
| Operating Pressure | −40 Kpa | −40 Kpa |
| Flavour Flow Rate | 42 l · hr$^{-1}$ | 75 l · hr$^{-1}$ |
| Flavour Extract: | | |
| Total Juice Ratio | 1:120 | 1:50 |

3. Handle deflavoured juice through normal processing steps; i.e. fining, filtration, concentration etc.
4. Recombine flavour extract and processed juice at point of packing for consumer sale.

Some particular advantages of using the rotating cone column of the invention together with a externally induced gas flow is that a relatively inert and inexpensive gas such as nitrogen can be used to minimise oxidation and thus degradation of flavours and aromas during the evaporation process. Furthermore the evaporation temperature in the column can be adjusted to a desired level to optimise evaporation rate and minimise thermal degradation by regulating gas flow rate and product flow rate. The effects of various gas and product flow rates on the temperature of evaporation of apple juice in a rotating cone column of the invention are listed in Table 9.

TABLE 9

| Product Flow (l · hr$^{-1}$) | 4680 | 4200 | 4200 | 2400 |
|---|---|---|---|---|
| Essence Flow (l · hr$^{-1}$) | 42 | 21 | 38 | 90 |
| Essence Concentration | 1:110 | 1:200 | 1:110 | 1:22 |
| Gas Flow Rate (m$^3$hr$^{-1}$) | 400 | 200 | 200 | 500 |
| Gas Temp Top of Spinning Cone Column | 65 | 66 | 72 | 66 |
| Gas Temp After Condenser | 15 | 15 | 15 | 22 |

EXAMPLE 5

There are currently two types of desulphuring plants in general use:
1. Those using recirculated nitrogen as a stripping medium. As far as the prior art is known plants of this type, unlike plants of this invention, do not use heat reinjection to reduce heat damage and counteract evaporative cooling.
2. Those using steam from a reboiler as a stripping medium. These units have a higher product loss (up to 10%) and cause more heat damage than plants of this invention due to the higher temperatures required to generate steam flow rate from boiling.

A typical desulphurization procedure which includes using the spinning cone column of the invention is as follows:
1. Extract juice from fruit as normal.
2. Remove flavour extract from juice with Recovery Plant including rotating cone column and store.
3. Add sulphur dioxide to extracted juice to recommended level.
4. Store extracted juice ambient temperature storage tanks.
5. Allow fruit solids to settle from extracted juice with gravity over 10 to 15 days.
6. Filter extracted juice with fine grade earth.
7. Filter fruit solids with rotary drum vacuum filter or high pressure lees filter.
8. Return juice recovered from fruit solids to filtered extracted juice from 6.
9. Store combined extracted juice at ambient temperature until required.
10. Remove sulphur dioxide from combined extracted juice with rotating cone column.
11. Add flavour extract from 2 to combined extracted juice from 10.

Typical operating conditions of the rotating cone column during desulphurization are listed in Table 10.

TABLE 10

| Product | Normal Wine Production | Preservative Free Juice |
|---|---|---|
| Incoming Sulphur Dioxide Level | 1500 ppm | 1000 |
| Product Flow Rate | 5000 l · hr$^{-1}$ | 4000 |
| Operating Temperature | 100° C. | 105 |
| Operating Pressure | 100 Kpa | 100 |
| Outgoing Product Sulphur Dioxide Level | 100 ppm | 0 |
| Outgoing Product pH | 3.40 | 3.15 |

Notes:
[1]Higher sulphur dioxide levels than above can be handled with slower flow rates.
[2]Flow rates as high as 7000 liters per hour can be used in a prototype rotating cone column of the invention but higher operating temperatures are required. Temperatures as high as 130° C. can be used.
[3]Outgoing sulphur dioxide level is dependent on: (1) pH: Low pH gives lower sulphur dioxide levels with other conditions constant. (2) Temperature: Higher temperature gives lower sulphur dioxide levels with other conditions constant.

EXAMPLE 6

Typical dealcoholisation procedures which include using the rotating cone column of the invention are as follows:

A. Low Alcohol Wine (less than 0.1% v/v)
1. Remove aroma extract from grape juice using a Recovery Plant including rotating cone column and store.
2. Adjust acid in extracted grape juice to desired level.
3. Ferment extracted grape juice to wine.
4. Remove alcohol using rotating cone column.
5. Add back aroma extract of 1.
6. Blend in original grape juice to achieve desired sweetness level.

B. Alcohol Reduced Wine Method 1
1. Produce low alcohol wine as for A.
2. Add back flavour alcohol extract collected from vacuum pump during dealcoholisation to achieve desired level of alcohol.

C. Alcohol Reduced Wine Method 2
1. Produce low alcohol wine as for A.
2. Blend with normal strength wine to achieve desired level of alcohol.

D. Alcohol Reduced Wine Method 3
1. Remove aroma extract from grape juice using a Recovery Plant including rotating cone column.
2. Adjust acid in extracted grape juice to desired level.
3. Partially ferment extracted grape juice.
4. Stop fermentation at a level of sweetness sufficient to give desired alcohol level when fermentation is restarted.
5. Remove alcohol using rotating cone column.
6. Complete fermentation.
7. Add back aroma extract of 1.
8. Sweeten with original grape juice to the desired level.

Typical operation conditions of the rotating cone column during dealcoholisation are listed in Table 11.

TABLE 11

| Incoming Product Strength | 10.0% v.v |
|---|---|
| Product Flow Rate | 1500 l · hr$^{-1}$ |
| Operating Temperature | 75° C. |
| Operating Pressure | −20 Kpa |
| Outgoing Product Strength | Less than 0.1% v/v |
| Spirit Strength | 55% v./v |

Notes:
[1]Operating temperature is dependent on operating pressure. This can be lowered to prevent heat damage of certain products if so desired.
[2]Flow rate is dependent on outgoing strength. e.g. 4.0% v/v flow rate is increased to 4500 l · hr$^{-1}$.
[3]Spirit strength can be increased to 85% by using part of top section of the rotating cone column for further rectification.

What is claimed is:
1. A counter-current contacting device comprising:
   a housing having a vertical longitudinal axis:
   a rotatable shaft at least partially disposed within said housing, so as to extend longitudinally thereof, and which is vertically adjustable relative to said housing;

at least one inverted cone mounted on said shaft within said housing and having at least one fin extending outwardly from said shaft and mounted along said cone and extending downwardly from said cone to provide a fin distal border;

said housing having a first lower frustoconical surface over which liquid can pass and extending inwardly from the inner wall thereof and disposed so as to be approximately adjacent to said distal border and adjustable relative thereto by said relative adjustment to provide a selectable gap, a motor coupled to said shaft to rotate said shaft;

said housing having coupled operatively therewith means to recirculate liquid passing through the device from at least one liquid outlet associated with said housing to approximately above said first lower frustoconical surface through at least one liquid inlet into said housing, said means to recirculate liquid including means to heat said liquid prior to its reintroduction into said housing;

a second lower frustoconical surface below said first lower frustoconical surface and at least two upper frustoconical surfaces above said liquid inlet and wherein the spacing between said lower frustoconical surfaces is greater than the spacing between said upper frustoconical surfaces above said liquid inlet to provide for an increased flow volume of a liquid across said lower frustoconical surfaces as compared with the flow volume of liquid across said upper frustoconical surfaces to ameliorate flooding in said device as a result of liquid recirculating into said device by said means to recirculate liquid.

2. The device as defined in claim 1 wherein said border and first lower frustoconical said surface converge radially outward whereby said border is substantially parallel to a surface of a liquid passing over said frustoconical surface.

3. The device as defined in claim 1 wherein there is more than one cone, each having a frustoconical surface over which liquid can pass and extending inwardly from an inner wall of the housing and disposed so as to be adjacent said distal border and adjustable relative thereto by said relative adjustment to provide a selectable gap.

4. The device as defined in claim 1 wherein said housing is sealed and is operatively coupled with means to recycle a gas and vapour through said device.

5. The device as defined in claim 1 wherein said housing is sealed and operatively coupled to said housing are vacuum pumping means to reduce the pressure of gas vapour in said device and thereby increase separation and efficiency of separation of at least one selected volatile component from a liquid passing through said device.

6. The device as defined in claim 1 wherein said housing is sealed and operatively coupled to means to pump gas and vapour through said device to increase the flow rate of said gas and vapour through said device and thereby increase the separation and efficiency of separation of at least one selected volatile component from a liquid passing through the device.

7. The device as defined in claim 1 wherein the shaft is adjustable along said longitudinal axis of the housing to enable selection of said gap.

8. A system for reducing the alcohol content of an alcohol containing beverage comprising:

a source of said beverage;

a beverage inlet line coupling said source with a counter-current contacting device;

said counter-current contacting device comprising:

a housing having a vertical longitudinal axis;

a rotatable shaft at least partially disposed within said housing, so as to extend longitudinally thereof, and which is vertically adjustable relative to said housing;

at least one inverted cone mounted on said shaft within said housing an having at least one fin extending outwardly from said shaft and mounted along said cone and extending downwardly from said cone to provide a fin distal border;

said housing having a first lower frustoconical surface over which the beverage can pass and extending inwardly from the inner wall thereof and disposed so as to be approximately adjacent to said distal border and adjustable relative thereto by said relative adjustment to provide a selectable gap, a motor coupled to said shaft to rotate said shaft;

said housing having coupled operatively therewith means to recirculate the beverage passing through the device from at least one liquid outlet associated with said housing to approximately above said first lower frustoconical surface through at least one liquid inlet into said housing, said means to recirculate the beverage including means to heat said beverage prior to its reintroduction into said housing;

a second lower frustoconical surface below said first lower frustoconical surface and at least two upper frustoconical surfaces above said liquid inlet and wherein the spacing between said lower frustoconical surfaces is greater than the spacing between said upper frustoconical surfaces above said liquid inlet to provide for an increased flow volume of the beverage across said lower frustoconical surfaces as compared with the flow volume of the beverage across said upper frustoconical surfaces to ameliorate flooding in said device as a result of beverage recirculating into said device by said means to recirculate liquid;

a heater operatively associated with said device to heat beverage in the device to an alcohol separating temperature; and a condenser operatively associated with said device to condense alcohol separated from the beverage.

9. The system as defined in claim 8 wherein said border and first lower frustoconical said surface converge radially outward whereby said border to substantially parallel to a surface of a beverage passing over said frustoconical surface.

10. A system for reducing the alcohol content of wine comprising:

a source of said wine;

a wine inlet line coupling said source with a counter-current contacting device;

a wine feeding means operatively associated with the wine inlet line to feed wine from said source through said wine inlet line and into said counter-current contacting device;

said counter-current contacting device comprising:

a housing having a vertical longitudinal axis;

a rotatable shaft at least partially disposed within said housing, so as to extend longitudinally thereof, and which is vertically adjustable relative to said housing;

at least one inverted cone mounted on said shaft within said housing and having at least one fin extending outwardly from said shaft and mounted along said cone and extending downwardly from said cone to provide a fin distal border;

said housing having a first lower frustoconical surface over which the wine can pass and extending inwardly from the inner wall thereof and disposed so as to be approximately adjacent to said distal border and adjustable relative thereto by said relative adjustment to provide a selectable gap, a motor coupled to said shaft to rotate said shaft;

said housing having coupled operatively therewith means to recirculate the wine passing through the device from at least one liquid outlet associated with said housing to approximately above said first lower frustoconical surface through at least one liquid inlet into said housing, said means to recirculate the wine including means to heat said wine prior to its reintroduction into said housing;

a second lower frustoconical surface below said first lower frustoconical surface and at least two upper frustoconical surfaces above said liquid inlet and wherein the spacing between said lower frustoconical surfaces is greater than the spacing between said upper frustoconical surfaces above said liquid inlet to provide for an increased flow volume of the wine across said lower frustoconical surfaces as compared with the flow volume of the wine across said upper frustoconical surfaces to ameliorate flooding in said device as a result of wine recirculating into said device by said means to recirculate the wine;

a heater operatively associated with said device to heat wine in the device to an alcohol separating temperature; and a condenser operatively associated with said device to condense alcohol separated from the wine.

11. The system as defined in claim 10 wherein said border and first lower frustoconical said surface converge radially outward whereby said border is substantially parallel to a surface of a wine passing over said frustoconical surface.

12. A system for stripping aroma and flavour from a fruit juice comprising:

a source of said fruit juice;

a fruit juice inlet line coupling said source with a counter-current contacting device;

said counter-current contacting device comprising:

housing having a vertical longitudinal axis;

a rotatable shaft at least partially disposed within said housing, so as to extend longitudinally thereof, and which is vertically adjustable relative to said housing;

at least one inverted cone mounted on said shaft within said housing and having at least one fin extending outwardly from said shaft and mounted along with cone and extending downwardly from said done to provide a fin distal border;

said housing having a first lower frustoconical surface over which the fruit juice can pass and extending inwardly from the inner wall thereof an disposed so as to be approximately adjacent to said distal border and adjustable relative thereto by said relative adjustment to provide a selectable gap;

a motor coupled to said shaft to rotate said shaft;

said housing having coupled operatively therewith means to recirculate the fruit juice passing through the device from at least one liquid outlet associated with said housing to approximately above said first lower frustoconical surface through at least one liquid inlet into said housing, said means to recirculate the fruit juice including means to heat said fruit juice prior to its reintroduction into said housing;

a second lower frustoconical surface below said first lower frustoconical surface and at least two upper frustoconical surfaces above said liquid inlet and wherein the spacing between said lower frustoconical surface is greater than the spacing between said upper frustoconical surfaces above said liquid inlet to provide for an increased flow volume of the fruit juice across said lower frustoconical surfaces as compared with the flow volume of the fruit juice across said upper frustoconical surfaces to ameliorate flooding in said device as a result of fruit juice recirculating into said device by said means to recirculate the fruit juice;

a heater operatively associated with said device to heat fruit juice int he device to an aroma and flavour stripping temperature; and a condenser operatively associated with said device to condense aroma and flavour separated from the fruit juice.

13. The system as defined in claim 12 wherein said border and first lower frustoconical said surface converge radially outward whereby said border is substantially parallel to a surface of a fruit juice passing over said frustoconical surface.

14. A system to desulphuring a liquid containing dissolved sulphur dioxide comprising:

a source of said liquid;

a liquid inlet line coupling said source with a counter-current contact device;

a liquid feeding means operatively associated with the liquid inlet line to feed liquid from said source through said liquid inlet line and into said counter-current contact device;

said counter-current contacting device comprising:

a housing having a vertical longitudinal axis;

a rotatable shaft at least partially disposed within said housing, so as to extend longitudinally thereof, and which is vertically adjustable relative to said housing;

at least one inverted cone mounted on said shaft within said housing and having at least one fin extending outwardly from said shaft and mounted along with cone and extending downwardly from said cone to provide a fin distal border;

said housing having a first lower frustoconical surface which the liquid can pass and extending inwardly from the inner wall thereof and disposed so as to be approximately adjacent to said distal border and adjustable relative thereto by said relative adjustment to provide a selection gap, a motor coupled to said shaft to rotate said shaft;

said housing have coupled operatively therewith means to recirculate the liquid passing through the device from at least one liquid outlet associated with said housing to approximately above said first lower frustoconical surface through at least one liquid inlet into said housing, said mens to recirculate the liquid including means to heat said liquid prior to its reintroduction into said housing;

a second lower frustoconical surface below said first lower frustoconical surface and at least two upper frustoconical surfaces above said liquid inlet and wherein the spacing between said lower frustoconical surfaces is greater than the spacing between said upper frustoconical surfaces above said liquid inlet to provide for an increased flow volume of the liquid across said lower frustoconical surfaces as compared with the flow volume of the liquid across said upper frustoconical surfaces to ameliorate flooding in said device as a result of liquid recirculating into said device by said means to recirculate the liquid; and a heater operatively associated with said device to heat liquid in the device to a sulphur dioxide separating temperature.

15. The system as defined in claim 14 wherein said border and first lower frustoconical said surface converge radially outward whereby said border is substantially parallel to a surface of a fruit juice passing over said frustoconical surface.

* * * * *

UNITED STATES PATENT AND TRADEMARK OFFICE
CERTIFICATE OF CORRECTION

PATENT NO. : 4,995,945
DATED : February 26, 1991
INVENTOR(S) : Craig

It is certified that error appears in the above-identified patent and that said Letters Patent is hereby corrected as shown below:

Column 1, line 40, change "patent" to --Patent--.

Column 2, line 26, change "producers" to --Producers--.

Column 2, line 45, after "shaft" insert --.-- (period).

Column 2, line 63, change "cross sections" to --cross-sections--.

Column 3, line 15, change "obJect" to --object--.

Column 6, line 3, change "mean" to --means--.

Column 7, line 19, after "capacity" insert --.-- (period).

Column 9, line 67, after "column" insert --.-- (period).

Column 10, line 39, after "liquid" insert --.-- (period).

Column 11, line 4, change "23" to --33--.

Column 11, line 46, change "70and" to --70 and--.

Column 12, line 68, change "t" to --to--.

Column 13, line 3, change "1.hr--1" to --1.hr$^{-1}$--.

Column 13, line 27, after "2)" insert --.-- (period).

UNITED STATES PATENT AND TRADEMARK OFFICE
CERTIFICATE OF CORRECTION

PATENT NO. : 4,995,945

DATED : February 26, 1991

INVENTOR(S) : Craig

It is certified that error appears in the above-identified patent and that said Letters Patent is hereby corrected as shown below:

Column 13, line 40, change "through" to --though--.

Column 16, line 49, change "operation" to --operating--.

Column 16, line 50, change "." (period) to --:-- (colon).

IN THE CLAIMS:

Claim 1, Column 16, line 66, change ":" (colon) to --;-- (semi-colon).

Claim 2, Column 17, line 37, change "first lower frustoconical said surface" to --said first lower frustoconical surface--.

Claim 3, Column 17, line 43, after "each" insert --cone--.

Claim 9, Column 18, line 52, change "first lower frustoconical said surface" to --said first lower frustoconical surface--.

Claim 9, Column 18, line 53, after "border" change "to" to --is--.

Claim 11, Column 19, line 42, change "first lower frustoconical said surface" to --said first lower frustoconical surface--.

Claim 12, Column 20, line 13, change "surface to --surfaces--.

Claim 12, Column 20, line 23, change "int he" to --in the--.

UNITED STATES PATENT AND TRADEMARK OFFICE
CERTIFICATE OF CORRECTION

PATENT NO. : 4,995,945

DATED : February 26, 1991

INVENTOR(S) : Craig

It is certified that error appears in the above-identified patent and that said Letters Patent is hereby corrected as shown below:

Claim 13, Column 20, line 30, change "first lower frustoconical said surface" to --said first lower frustoconical surface--.

Claim 15, Column 22, line 7, change "first lower frustoconical said surface" to --said first lower frustoconical surface--.

Signed and Sealed this

Thirteenth Day of July, 1993

Attest:

MICHAEL K. KIRK

Attesting Officer

Acting Commissioner of Patents and Trademarks